US010301696B2

(12) United States Patent
Sellen et al.

(10) Patent No.: US 10,301,696 B2
(45) Date of Patent: May 28, 2019

(54) METALLIC BODY WITH THREADED PORT SUBJECT TO AUTOFRETTAGE

(71) Applicant: Luxembourg Patent Company S.A., Lintgen (LU)

(72) Inventors: Stephan Sellen, Wehingen (DE); Philippe Schmitz, Steinsel (LU)

(73) Assignee: Luxembourg Patent Company S.A., Lintgen (LU)

( * ) Notice: Subject to any disclaimer, the term of this patent is extended or adjusted under 35 U.S.C. 154(b) by 69 days.

(21) Appl. No.: 15/114,523

(22) PCT Filed: Jan. 27, 2015

(86) PCT No.: PCT/EP2015/051624
§ 371 (c)(1),
(2) Date: Jul. 27, 2016

(87) PCT Pub. No.: WO2015/113976
PCT Pub. Date: Aug. 6, 2015

(65) Prior Publication Data
US 2016/0340754 A1    Nov. 24, 2016

(30) Foreign Application Priority Data

Jan. 28, 2014 (LU) .......................... 92363

(51) Int. Cl.
*C21D 7/12* (2006.01)
*C22F 1/04* (2006.01)
(Continued)

(52) U.S. Cl.
CPC .................. *C21D 7/12* (2013.01); *B23P 9/02* (2013.01); *C22F 1/04* (2013.01); *F16K 27/00* (2013.01); *C22F 1/05* (2013.01)

(58) Field of Classification Search
CPC ......... Y10T 29/49405; Y10T 29/49412; Y10T 29/49423; Y10T 29/49805;
(Continued)

(56) References Cited

U.S. PATENT DOCUMENTS 4,354,371 A * 10/1982 Johnson ................... B23P 9/00
72/53
4,417,459 A    11/1983 Tomita
(Continued)

FOREIGN PATENT DOCUMENTS

| DE | 19650736 C1 | 9/1998 |
| EP | 2532473 A1 | 12/2012 |
| JP | 2012158990 A | 8/2012 |

OTHER PUBLICATIONS

International Preliminary Report on Patentability dated Aug. 2, 2016 for parent PCT application PCT/EP2015/051624.
(Continued)

*Primary Examiner* — Reinaldo Sanchez-Medina
*Assistant Examiner* — Hailey K. Do
(74) *Attorney, Agent, or Firm* — James E. Walton

(57) ABSTRACT

The invention is directed to a method for improving the mechanical behavior of a metallic body (4) comprising an internal volume for a fluid and at least one threaded connecting port (6, 8) to said internal volume, the method comprising a step of treatment by autofrettage of the internal volume by applying a pressure to a liquid inside said volume. The autofrettage step comprises closing the internal volume by screwing a plug (28) to each the at least one threaded connecting port (8), so that the thread(s) of said port(s) is/are also subject to the autofrettage treatment. The invention is also directed to a body (4) resulting from such a treatment, with compressive stresses at the root of one of the most carrying turns of the thread of each of the con-
(Continued)

necting ports. The compressive stresses improve the fatigue behavior of the body.

14 Claims, 7 Drawing Sheets

(51) Int. Cl.
*C22F 1/05* (2006.01)
*B23P 9/02* (2006.01)
*F16K 27/00* (2006.01)

(58) Field of Classification Search
CPC ... Y10T 29/49863; F16L 15/006; F16L 15/06; F16L 15/02; F16L 55/1108; F16L 58/182; C21D 7/12; C21D 7/08; C21D 7/10; C21D 7/04; C21D 7/06; F02M 2200/8053; F02M 2200/8076; F02M 2200/9061; F16K 27/00
See application file for complete search history.

(56) References Cited

U.S. PATENT DOCUMENTS

| | | | | |
|---|---|---|---|---|
| 5,291,842 A | * | 3/1994 | Sallstrom | A01C 23/026 111/127 |
| 5,605,449 A | * | 2/1997 | Reed | F04B 53/1022 137/454.4 |
| 8,099,850 B2 | * | 1/2012 | Bitto | G01F 1/8409 29/452 |
| 2008/0000065 A1 | * | 1/2008 | Ganguly | F04B 53/162 29/421.1 |
| 2010/0154501 A1 | | 6/2010 | Kampmann et al. | |
| 2014/0291048 A1 | * | 10/2014 | Morales | F17C 1/14 180/69.5 |

OTHER PUBLICATIONS

Search Report dated May 12, 2015 for parent PCT application PCT/EP2015/051624.
Kohlenbecker, M.J. and Roos, E. (2013), Stabilitat von Druckeigenspannungen unter zyklischer Beanspruchung fur autifrettierte Bauteile aus Aluminium. Mat.-wiss u. Werkstofftech., 44: 813-818.

* cited by examiner

METALLIC BODY WITH THREADED PORT SUBJECT TO AUTOFRETTAGE

TECHNICAL FIELD

The invention is directed to the field of metallic bodies comprising an internal volume and at least one threaded connection port. Such bodies can among others be cylinder shaped connectors and bodies of gas valves. The invention is directed to a method of improving the mechanical behavior of such bodies. The invention is also directed to such bodies.

BACKGROUND ART

Autofrettage is as such a known metal fabrication technique in which a pressure vessel is subjected to enormous pressure, causing internal portions of the part to yield and resulting in internal compressive residual stresses. The aim of autofrettage is to increase the fatigue durability of the final product under cyclic load. The technique is commonly used in manufacturing high-pressure pump cylinders, warship and tank gun barrels, and fuel injection systems for diesel engines. While some work hardening will occur, that is not the primary mechanism of strengthening.

Prior art document published US 2010/0154501 A1 is directed to an autofrettage process of a cylindrical thick-walled work piece used in "common rail" diesel injection systems for combustion engines. The purpose of this treatment is to increase the fatigue behavior of the work piece. The work piece is specifically cylindrical without threaded ports. The piece is positioned and pressed between two elements of the autofrettage tooling. The bottom element of the tooling comprises sealing means coming into a contact with a flat front surface of the work piece whereas the upper element equipped with a displacement piston generating the autofrettage pressure comes into a contact with the opposite front surface of the work piece by means of a conical surface. The work piece is therefore pressed between the bottom and upper element so as to have a tight cooperation.

Prior art document published U.S. Pat. No. 4,417,459 discloses similarly to the above document an autofrettage process for thick-walled cylindrical work pieces. In this teaching, the autofrettage process comprises a cyclic treatment where the pressure is applied in a repetitive and cyclic manner. Similarly to the above document, the work piece is sandwiched between two elements of the autofrettage tooling so as to provide a tight connection with the two opposed connecting ports of the work piece.

Prior art document DE 196 50 736 C1 discloses an autofrettage process similar to the process of the two above mentioned documents.

The above mentioned teachings do not however address the autofrettage of work pieces comprising threaded connection port, like the body of gas valve. Threads constitute also weak points with regard to fatigue resistance.

For hydrogen-powered vehicle applications, the COMMISSION REGULATION (EU) No 406/2010 of 26 Apr. 2010 and implementing Regulation (EC) No 79/2009 of the European Parliament and of the Council on type-approval of hydrogen-powered motor vehicles, have provisions that the components of the hydrogen supply of the vehicles must satisfy different tests. The valves must among others satisfy cyclic pressure tests. It is therefore wished that the valves for such applications can withstand a maximum static test pressure of 105 MPa (1050 bar) and a cyclic hydraulic pressure test of N=150 000 cycles with a cyclic pressure loading of 87.5 MPa and a stress ratio R=min stress/max stress=0.

SUMMARY OF INVENTION

Technical Problem

The invention has for technical problem to provide a solution for the manufacture of equipment for the supply of high pressure gas which must sustain cyclic loads, i.e. show resistance to fatigue behavior. More particularly, the invention has for technical problem to provide a solution for the manufacture of equipment for the supply of hydrogen in vehicles.

Technical Solution

The invention is directed to method for improving the mechanical behavior of a metallic body comprising an internal volume for a fluid and at least one threaded connecting port to said internal volume, the method comprising a step of treatment by autofrettage of the internal volume by applying a pressure to a liquid inside said volume; wherein the autofrettage step comprises closing the internal volume by screwing a plug to each the at least one threaded connecting port, so that the thread(s) of said port(s) is/are also subject to the autofrettage treatment The mechanical behavior that is improved is the fatigue behavior. The thread(s) can be female and/or male threads.

The plug(s) can be mounted in a gas tight manner either by means of its/their threaded engagement with the port(s) and/or by means of a gasket.

The surface of the plug(s) that is subject to the autofrettage pressure can be greater than 40%, preferably 50%, more preferably 60%, even more preferably 70%, of the cross-sectional surface of the corresponding thread(s).

According to a preferred embodiment of the invention, the plug or each of the plugs has a thread of a least 5, preferably 7, more preferably 9, turns. The thread of the plug or of each of the plugs is configured to cooperate with the corresponding thread of the body. When the thread of the body is a female one, the thread of the corresponding plug is a male one and vice versa.

According to a preferred embodiment of the invention, the thread of the connecting port or each of the threads of the connection ports has least 5, preferably 7, more preferably 9, turns.

According to a preferred embodiment of the invention, the at least one connecting port has a wall thickness of at least 2 mm, preferably of 2.5 mm, more preferably of 3 mm, even more preferably 4 mm.

According to a preferred embodiment of the invention, the pressure of the autofrettage treatment is comprised between 100 MPa and 500 MPa, preferably between 200 MPa and 400 MPa.

According to a preferred embodiment of the invention, the metallic body is made of aluminum, preferably wrought aluminum, more preferably aluminum of the 6000 series according to the International Alloy Designation System.

According to a preferred embodiment of the invention, the plug or each of the plugs is made of a metallic material with a modulus of elasticity that is greater by at least 50%, preferably by at least 100%, more preferably by at least 150%, of the modulus of elasticity of the material of the body.

According to a preferred embodiment of the invention, the plug or each of the plugs is made of a metallic material with a tensile yield strength that is greater by at least 20%, preferably by at least 50%, more preferably by at least 80%, of the tensile yield strength of the material of the body.

According to a preferred embodiment of the invention, the plug or each of the plugs is made of steel or stainless steel.

According to a preferred embodiment of the invention, the body is free of external forces during the autofrettage treatment.

According to a preferred embodiment of the invention, autofrettage treatment comprise a single pressure application during a laps of time comprised between 0.1 second and 10 seconds, preferably between 0.5 second and 5 seconds.

According to a preferred embodiment of the invention, pressure of the autofrettage treatment is comprised between 50% and 200%, preferably between 80% and 180%, more preferably between 100% and 150%, of the yield strength of the material of the body.

According to a preferred embodiment of the invention, after the autofrettage step, the body is assembled by screwing in each of the at least one connecting port a final element with a thread, the plug or each of the plugs being configured so that its thread engages the same turns of the thread of the connecting port as the final element. Each plug and corresponding final element are configured so as to similarly load the thread of the corresponding port, i.e. to have the same turn(s) of the port's thread carrying most of the load.

According to a preferred embodiment of the invention, the body is the body of a gas valve or a connecting pipe with at least an inlet port, an outlet port and a passage connecting the inlet port with the outlet port.

The invention is also directed to a body made of metallic material and comprising an internal volume for a fluid and at least one threaded connecting port to said internal volume, wherein the material of the body at the root of at least one of the turns of the thread comprises compressive stresses in the absence of external forces engaging with said thread. The compressive stresses result preferably from the method according to the invention.

According to a preferred embodiment of the invention, the turn(s) at the root of which compressive stresses are present is/are on a half portion of the thread that is on the body side. This turn or these turns is/are the most wearing turn(s) when engaged with a final element. This turn or these turns is/are not necessarily the first turn(s) (viewed from the body) that engage the final element.

According to a preferred embodiment of the invention, the thread comprises two flanks forming a helical V-shape, the compressive stresses being located essentially at the bottom of the flank that is on the external side with regard to the root.

According to a preferred embodiment of the invention, the compressive stresses are mainly oriented in a direction comprised in the plane of the flank that is on the external side with regard to the root, and crossing a main axis of the threaded port.

According to a preferred embodiment of the invention, the compressive stresses of at least 100 MPa, preferably of at least 200 MPa, more preferably 300 MPa.

According to a preferred embodiment of the invention, the connecting port or each of the connecting ports houses a final element with a corresponding thread engaging with the thread of said port, the turn of the thread of the port comprising the compressive stresses being the first turn, counting from the body towards the outside of the body, engaging with the corresponding thread of said final element.

The invention is also directed to a valve comprising a valve body, wherein said body is in accordance with any the invention.

Advantages of the Invention

According to the invention the end plugs should not be unloaded during the autofrettage process like this is a typical strategy. Vice versa the fatigue resistance of both the bore crossings and the threaded connections can be improved with only one process at the same time. Additionally, this process is by far more effective than generating an overmake torque with scattering coefficients e.g. the frictional coefficient or geometrical tolerances.

DESCRIPTION OF AN EMBODIMENT

Figure 1:
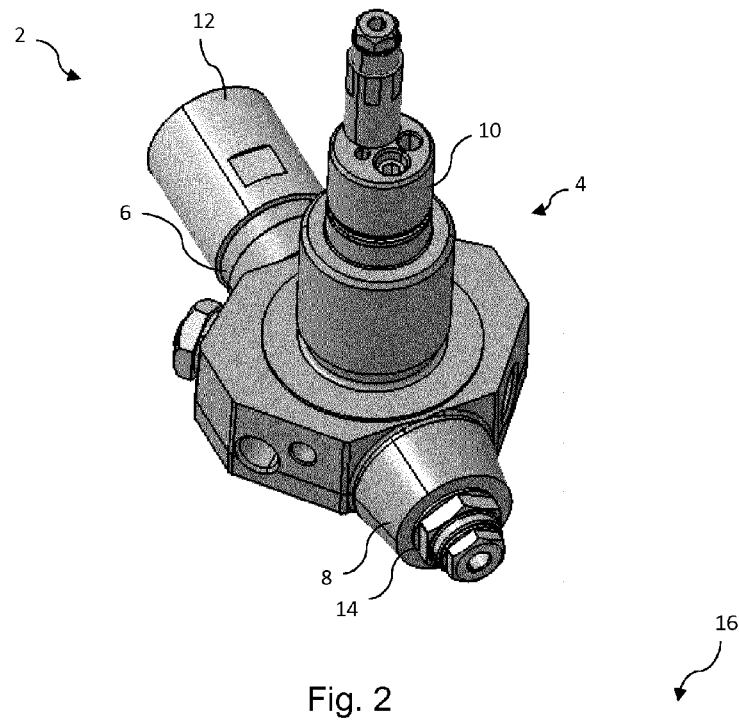
FIG. 1 is a perspective view of a gas valve in accordance with the invention.

FIG. 1 illustrates a gas valve for pressurized gas, for example for the delivery of hydrogen in a vehicle. The body 4 of the valve 2 comprises an elongated portion 10 for mounting on a gas tank, for instance on a gas cylinder. The inlet of the valve is therefore at the end of the upper end of the elongated portion 10. The valve body 4 comprises a series of bores and passages for interconnecting the different connecting ports. In the present example, the body 4 comprises two connecting ports 6 and 8 of a larger diameter compared to the others. The connecting port 6 for instance receives a solenoid for actuating a shut-off device inside the body 4. The connecting port 8 houses a manual shut-off valve 14. These ports 6 and 8 comprise female threads (not visible) for fastening their respective devices.

Figure 2:
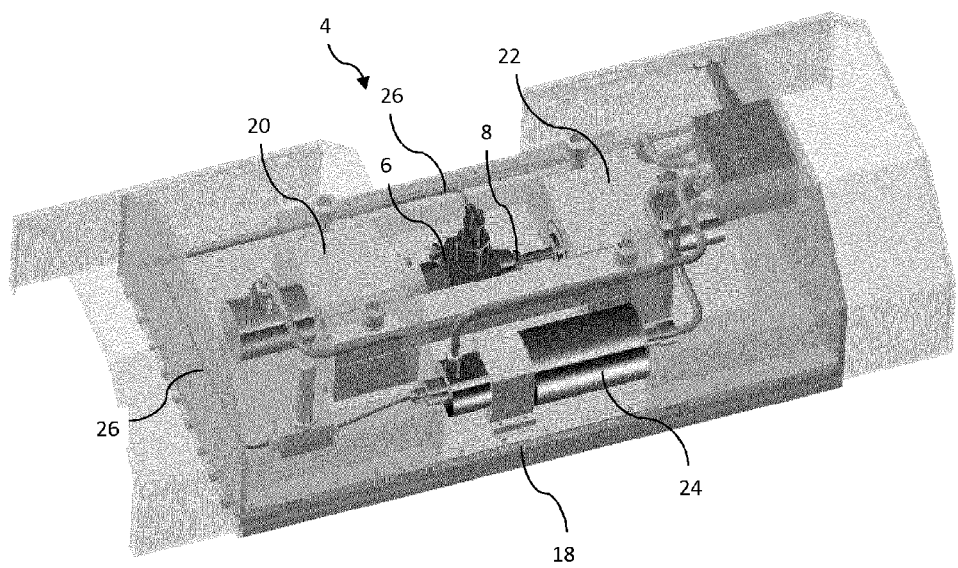
FIG. 2 is a perspective view of an example of an equipment for applying a treatment of autofrettage to a metallic body like the body of the valve of FIG. 1.

In FIG. 2, the teaching of the prior art discussed above is applied to the body of the gas valve of FIG. 1. More precisely, FIG. 2 illustrates a tooling 16 for applying an autofrettage treatment to the valve body 4. The tooling or autofrettage bed comprises a bed 18 on which two cylinders 20 and 22 are mounted in opposition. The valve body 4 is arranged between the two cylinders 20 and 22 by means of adapters serving as plugs. These can be engaged with the female threads of the connecting ports 6 and 8. These adapters engage with the cylinders 20 and 22 so as to press the body 4. The force exerted by the cylinders 20 and 22 can be proportional to the pressure of autofrettage. This latter is applied by means of a pressure amplifier 24 and a pipe 26 connected to another connecting port of the body 4. The idea of applying the proportional force on the adapters is to at least partially compensate the axial effort on these adapters resulting from the autofrettage pressure inside the body 4. The efforts exerted by the adapters on the threads of the connecting ports are therefore at least partly relieved.

Figure 3:
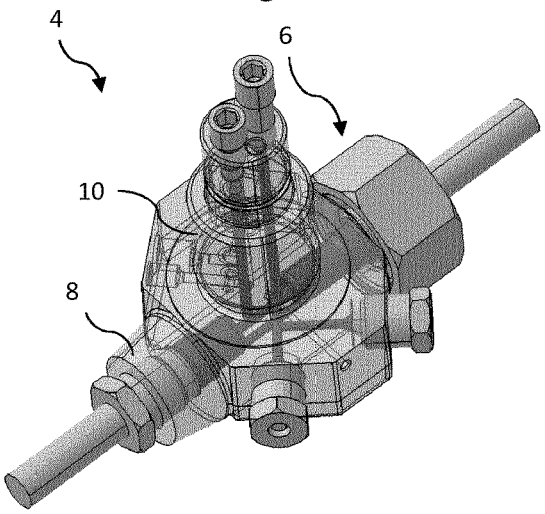
FIG. 3 is a perspective illustration of the valve body that is present in FIG. 2.

FIG. 3 illustrates in perspective the valve body 4 with plugs as in FIG. 2.

Figure 4:
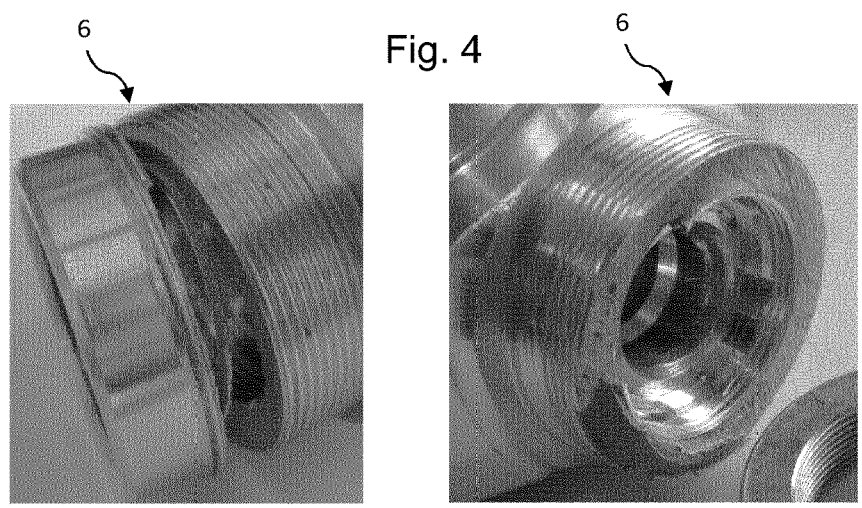
FIG. 4 illustrates two test bodies where connection ports broke during a cyclic test after an autofrettage treatment in the configuration of FIG. 2, i.e. unloading of the most critical threads by cylinder forces, which increase proportionally with the internal autofrettage pressure.

Cyclic pressure tests on the valve body treated by autofrettage as mentioned above has however resulted in failures of one of the connecting ports as illustrated in FIG. 4. As visible in FIG. 4, the connecting port 6 comprises an external thread; this external thread being for mounting the outer sleeve of the solenoid (see FIG. 1). The connection port 6 comprises also an internal thread for mounting internal parts (not represented) of the solenoid, these internal parts being subject the internal pressure of the body. Then proceeding to the cyclic pressure test, a plug has been mounted on the connecting port 6 by screwing with its internal female thread. The plug has been removed in FIG. 5 for the sake of clarity. The cyclic pressure applied in the internal volume of the body has therefore resulted in a cyclic effort on the port 6 via the engaged threads of the plug and the port.

Figure 5:
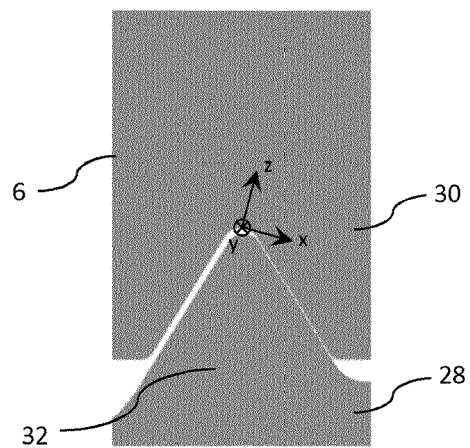
FIG. 5 is a schematic cut view of the thread engagement between the first turn of the female thread of a connecting port and a plug.

The rupture mechanism is illustrated in FIG. 5 which shows a partial sectional view of the port 6 and its plug 28. The first turn 32 of its male thread is in pressure contact with the corresponding turn 30 of the female thread of the port 6. The effort exerted on the plug 28 resulting from the pressure in the internal volume of the body generates a flexional effort on the flank of the thread turn 30. This effort creates traction stresses at the root of the flank. Under a fatigue analysis perspective, under cyclic testing, these stresses are also cyclic and reach levels that are prejudicial to the integrity of the material. The load ratio is close to zero since the load varies from 0.875 MPa to a maximal level of 87.5 MPa when the test pressure reaches the peek value. Depending on the level of the stress at the root and the number of cycles, cracks can appear and propagate in the direction of the arrow in FIG. 5, leading to a rupture.

Figure 6:
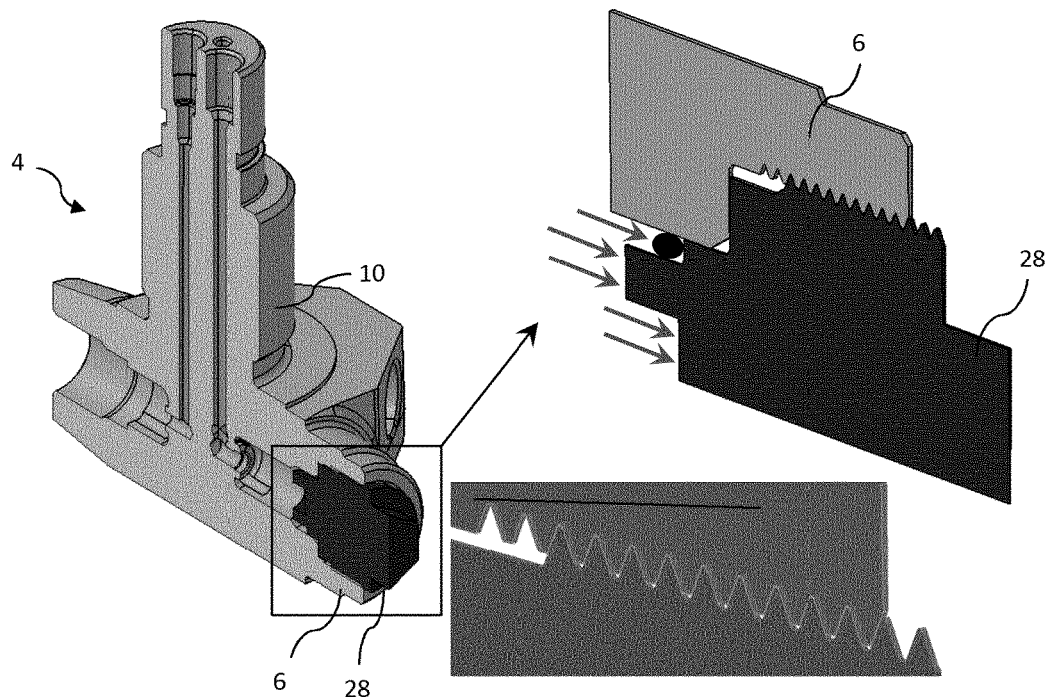
FIG. 6 is a perspective view of the valve body of FIG. 1, said body being cut along a longitudinal plane, and said body having a plug engaged in a connecting port.

FIG. 6 illustrates the valve body of FIG. 1, the body being cut longitudinally and rotated by 180° around the longitudinal axis of its elongate portion 10. Contrary to FIG. 1, the connecting port 6 is now at the forefront and the connecting port 8 at the background. The plug 28 is engaged in the connecting port 6. FIG. 6 comprises an enlarged view of the plug 28 and the connecting port 6. FIG. 6 comprises also an enlarged view of the thread engagement between the plug 28 and the connecting port 6. We can observe that the male thread of the plug 28 overlaps with the female thread of the port 6, i.e. that a portion of the female thread at its inside end is free of engagement with the male thread of the plug. This provides some clearance that avoids the male thread of the plug to reach the end of the female thread of the port before having its front surface abutting a shoulder portion inside the port. In the present case, about the first two turns of the female thread are free of engagement.

Figure 7:
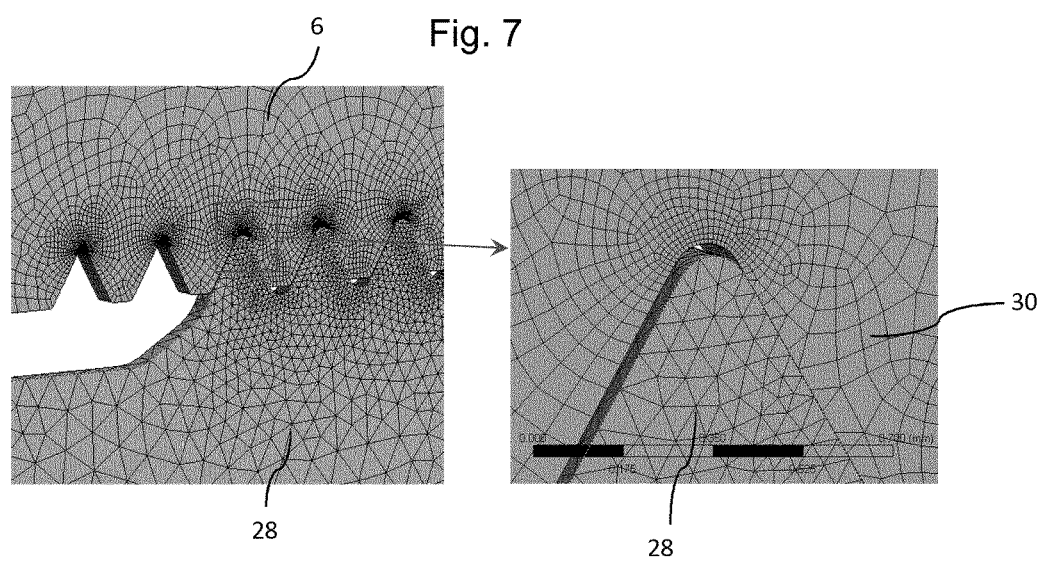
FIG. 7 illustrates the modeling meshing of the female and male threads of the connection port and plug, respectively, of FIG. 6.

FIG. 7 illustrates the finite element meshing of the threads for modeling purposes. The mesh has been locally refined at the contact region and at the root of the female thread with an element size of 8 µm, i.e. the root radius has more than 10 elements. A typical friction coefficient of $\mu=0.2$ for a non-lubricated thread connection was defined between the interacting flanks of the thread. Pre-stressing caused by screw tightening was neglected because the tightening torque was low (M=15 Nm) and the stiffness of the screwed connection was high, i.e. a simulation of the bolt pretension showed an axial plug compression of less than 10 µm, which is almost completely unclamped due to the occurring settling rates at the contact faces under the cyclic load. This effect was also observed after the experimental test as the torque to loosen the plug was less than 5 Nm.

The valve body was considered to be made of aluminum, more particularly of 6000-series aluminum, and even more particularly of AW-6082-T6 aluminum. The plug was considered to be made of stainless steel, more particularly of AISI 304 stainless steel. For the non-linear simulations a bilinear kinematic hardening model for the aluminum alloy (modulus of elasticity E=74,600 MPa; tangent modulus T=820 MPa; yield strength Rp=323 MPa) and a non-linear kinematic hardening material model for the stainless steel plug (E=193,280 MPa) were chosen.

Figure 8:
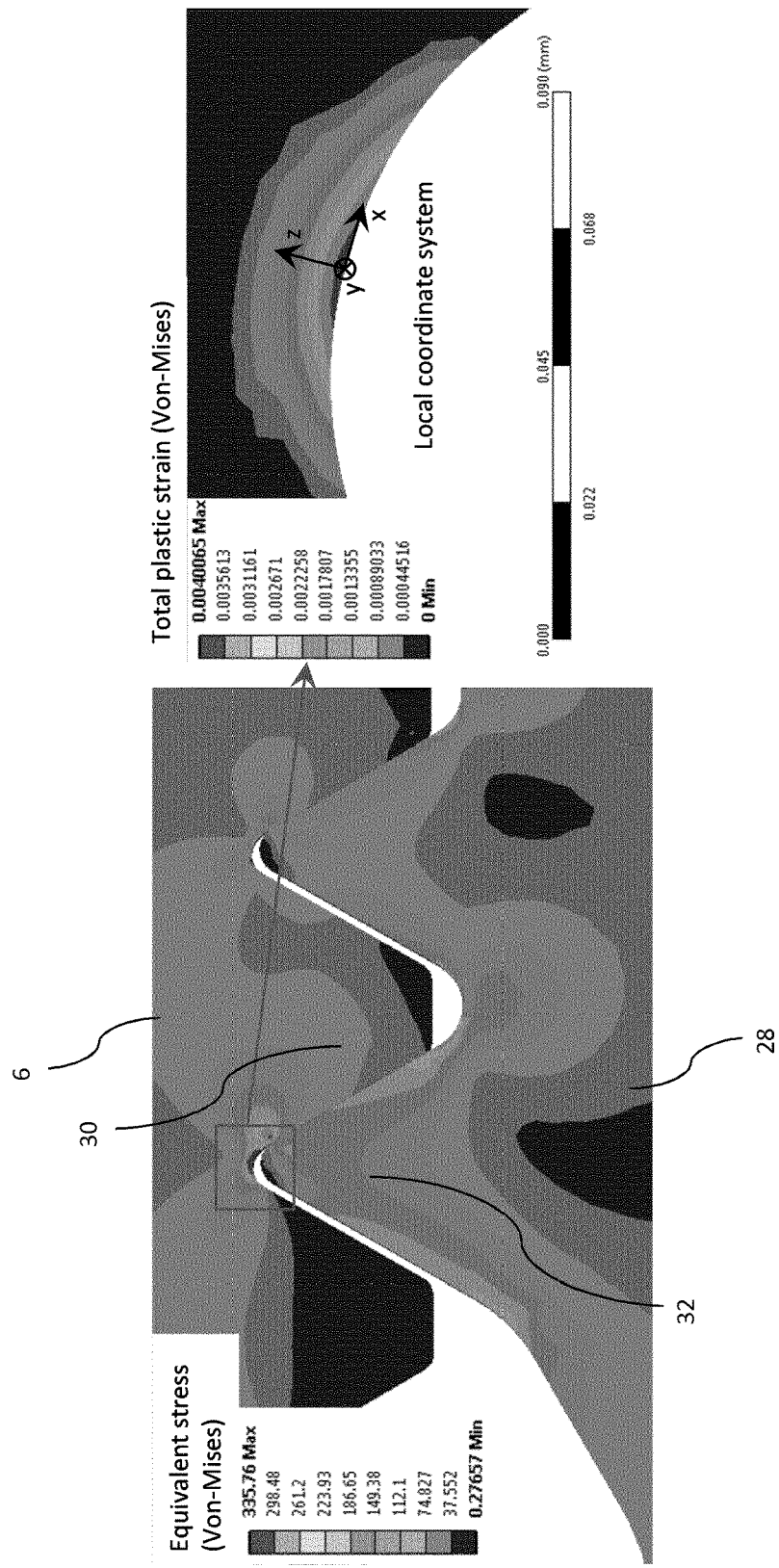
FIG. 8 illustrates the total plastic strain in the first carrying turn for the maximum operation load.

FIG. 8 illustrates the results of the non-linear finite element modeling for a pressure load of 87.5 MPa. This figure was originally in colors where the lowest stresses and strains (corresponding to the lower portions of the vertical scales) were represented in dark blue. In FIG. 8 (which is in black and white for reprography purposes), these areas are the darkest ones, e.g. at the non-stressed areas like the first left flank of the female thread of the port 6. Still in the original representation in colors, the highest stresses and strains (corresponding to the upper portions of the vertical scales) were represented in red. In FIG. 8, these areas are essentially on the right flank at the root level of the first thread turn of the port 6 in engagement with the plug thread. This area is within the square on the left part of FIG. 8.

Figure 9:
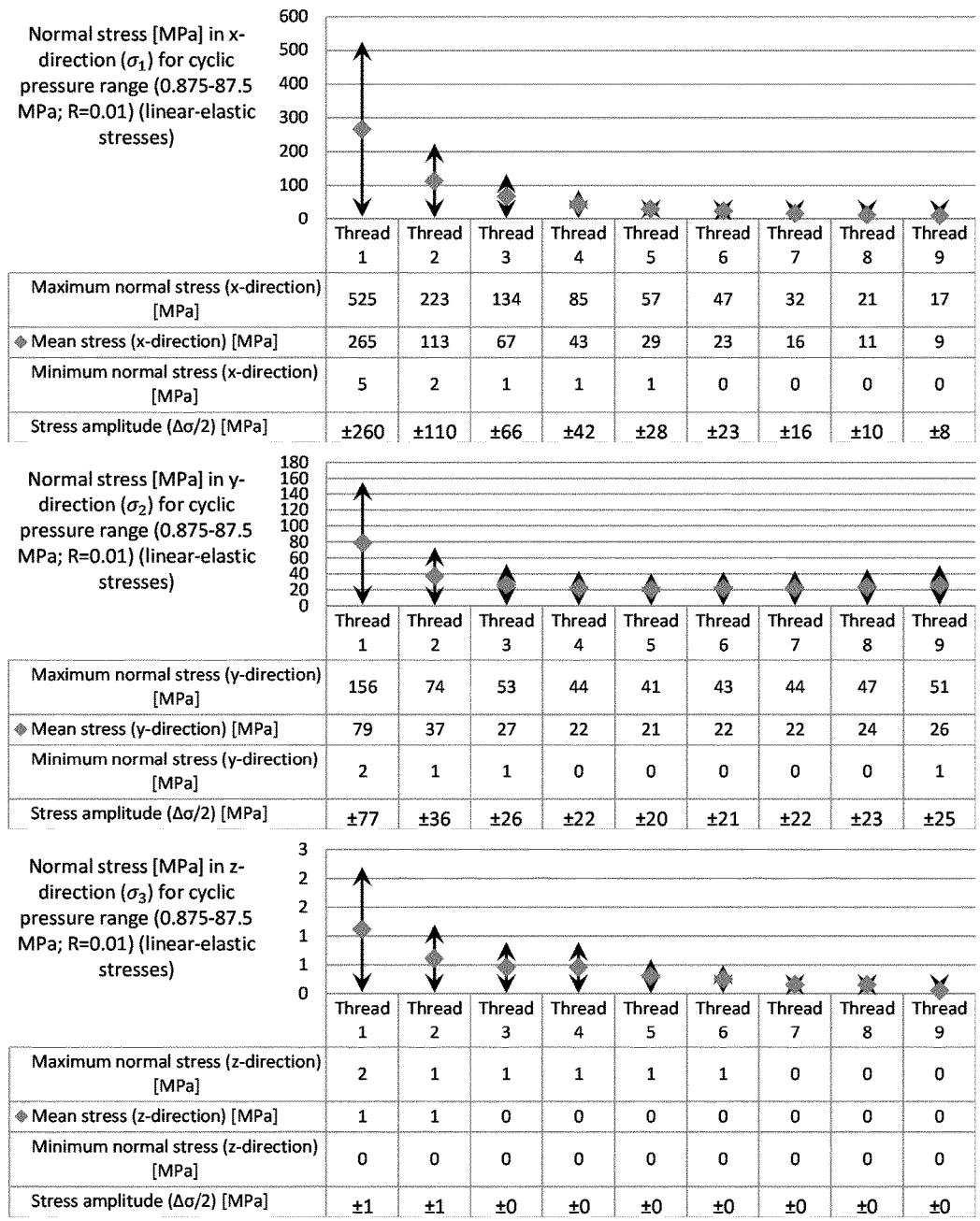
FIG. 9 is a table providing the elastic thread load distribution in the female aluminium thread roots without preliminary overload based on a linear-elastic finite element simulation. The illustrated stress range for every thread is caused by a cyclic load of 0.875-87.5 MPa.

As is visible in FIG. 9, the maximum operating pressure of 87.5 MPa causes the highest stress values at the first wearing turn of the thread. There is just a small zone of plastic straining at the root of the first wearing turn of the port's thread (less than 50 µm), i.e. only the female aluminum thread deforms plastically.

In the table of FIG. 9, as a further result of a linear elastic finite element simulation the three principal stress ranges including their mean stress values at the hot spot (directions see local coordinate system in FIG. 8) in the nine carrying valve body thread roots are listed for a cyclic pressure range p=0.875-87.5 MPa (R=0.01). The highest values occur in the first carrying thread in x-direction, which corresponds almost to the rotational axis direction of the thread connection. Furthermore the table in FIG. 8 indicates that the threads 4, 5, . . . , 9 are carrying almost no load.

The three principal stress amplitudes in the case of a complex spatial geometry have to be considered for the fatigue assessment according to the well-known FKM guideline. Based on linear-elastic finite element simulations of a structural component, the load factors for the three principal stresses can be determined and summed up to an equivalent load factor according to the VON-MISES equivalent stress hypothesis for ductile materials. For a three-dimensional geometry the maximum stress gradients of the first two principal stresses parallel to the surface have to be considered normal to the surface. To do so, the evaluation path s starts at the assessed point at the geometry surface and is directed normal to the surface towards the inner of the body (evaluation path s corresponds to the arrow in FIG. 5). The stress gradient of the third principal stress which is perpendicular to the surface is not considered. The cyclic load factor according to the VON-MISES theory is therefore proportional to the stress amplitude in the x and y directions, i.e. parallel to the surface. For an internal pressure $p_i$=0.875–87.5 MPa (R=0.01), cracks will occur after 31,000 cycles at a first principal load factor $a_{BK,\sigma_x}$=100% in the root of the critical first valve body thread. Thus a crack initiation occurs after 31,000 cycles in the root of the first female aluminium thread.

When the valve body 4 is subject to an autofrettage treatment where the plugs, for instance the plug 28, is relieved from external compression forces by tooling, contrary to what is done with the tooling of FIG. 2, the female thread of the port is subject also to an autofrettage, i.e. an axial overload resulting from the forces exerted by the plug. In other words, a static overload is applied to the female thread causing residual compressive stresses at the root of at least the first wearing turn. The autofrettage treatment is therefore useful not only for the surface of the internal cavity, in particular at bore intersections, but also for the threaded connecting ports.

Figure 10:
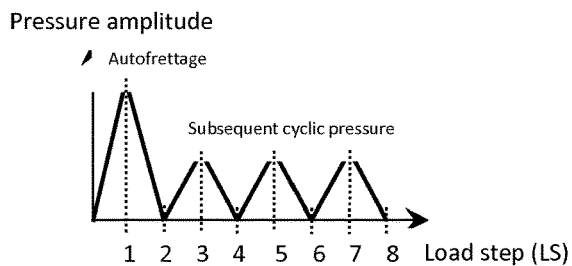
FIG. 10 is a schematic representation of the loads steps of autofrettage (LS1) and subsequent cyclic pressure loading at a much lower maximum operating pressure (LS3, LS4, . . . ).

The three important load steps (autofrettage pressure (LS1), complete relief (LS2) and maximum operating pressure (LS3)) of the geometry were simulated in a non-linear FE-simulation, including the pressure forces of the plugged ends. FIG. 10 illustrates the stress ranges from load step LS2 to LS3 after a preliminary autofrettage LS1 with a pressure of 300 MPa.

Figure 11:
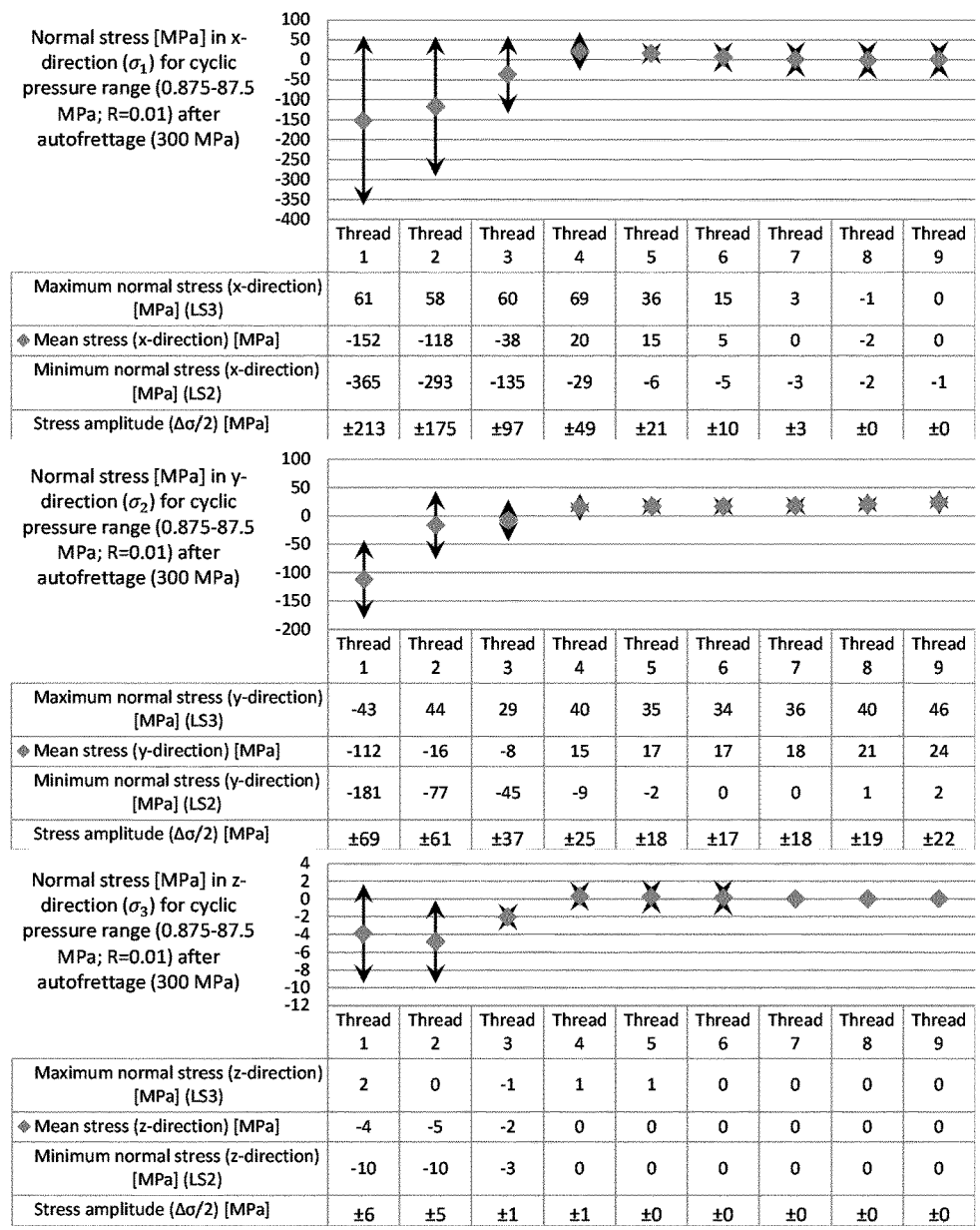
FIG. 11 is a table providing the thread load distribution in the female aluminium thread roots after autofrettage process according to the invention caused by the same cyclic load of 0.875-87.5 MPa according to FIG. 9.

FIG. 11 is a table providing the calculated normal stress ranges at the root of the wearing turns of the female thread of the port after autofrettage with 300 MPa. Regarding the mainly important local x-direction in the root of the female threads, the autofrettage of the valve body leads to substantive residual compressive stresses in the first carrying thread root and also in the second and third ones.

After autofrettage of the valve body including the threaded ports, meaning an axial overload force on the threaded connections (LS1, FIG. 10), the residual compressive stresses after complete removal (LS2, FIG. 10) describe the initial stress state without any operation load. The maximum stresses were taken from the elastic simulation at a maximum pressure load of 87.5 MPa. If we now repeat the fatigue calculation mentioned before for the first carrying female thread, the number of cycles to failure for the cyclic pressure load is highly increased. For an internal pressure $p_i$=0.875–87.5 MPa (R=0.01) after autofrettage with a pressure of 300 MPa, cracks will occur after 420,000 cycles at a first principal load factor $a_{BK,\sigma_x}$=100% in the root of the critical first thread. Thus the residual stresses cause, analogously to the bore intersections, an improved fatigue resistance.

But besides the effect of a shifted means stress to lower or in the best case negative values, which is typically for the autofrettage, a redistribution of the thread root stresses leads to a more homogenous load distribution along the threads. The normal stress amplitude in x-direction of the first critical thread is reduced by round about 19% from the initial normal stress amplitude without autofrettage $\sigma_{a,in}$=260 MPa (see FIG. 8) to a normal stress amplitude of $\sigma_{a,af}$=213 MPa (see FIG. 10) for the cyclic pressure range p=0.875–87.5 MPa (R=0.01) after a preliminary autofrettage with 300 MPa. This effect can be explained by the bending of the first thread in the axial connection direction as a balance to the residual stresses which have to be compensated. Considering additionally this effect in the fatigue calculation, the number of cycles for the pre-induced crack is more than one million.

Figure 12:
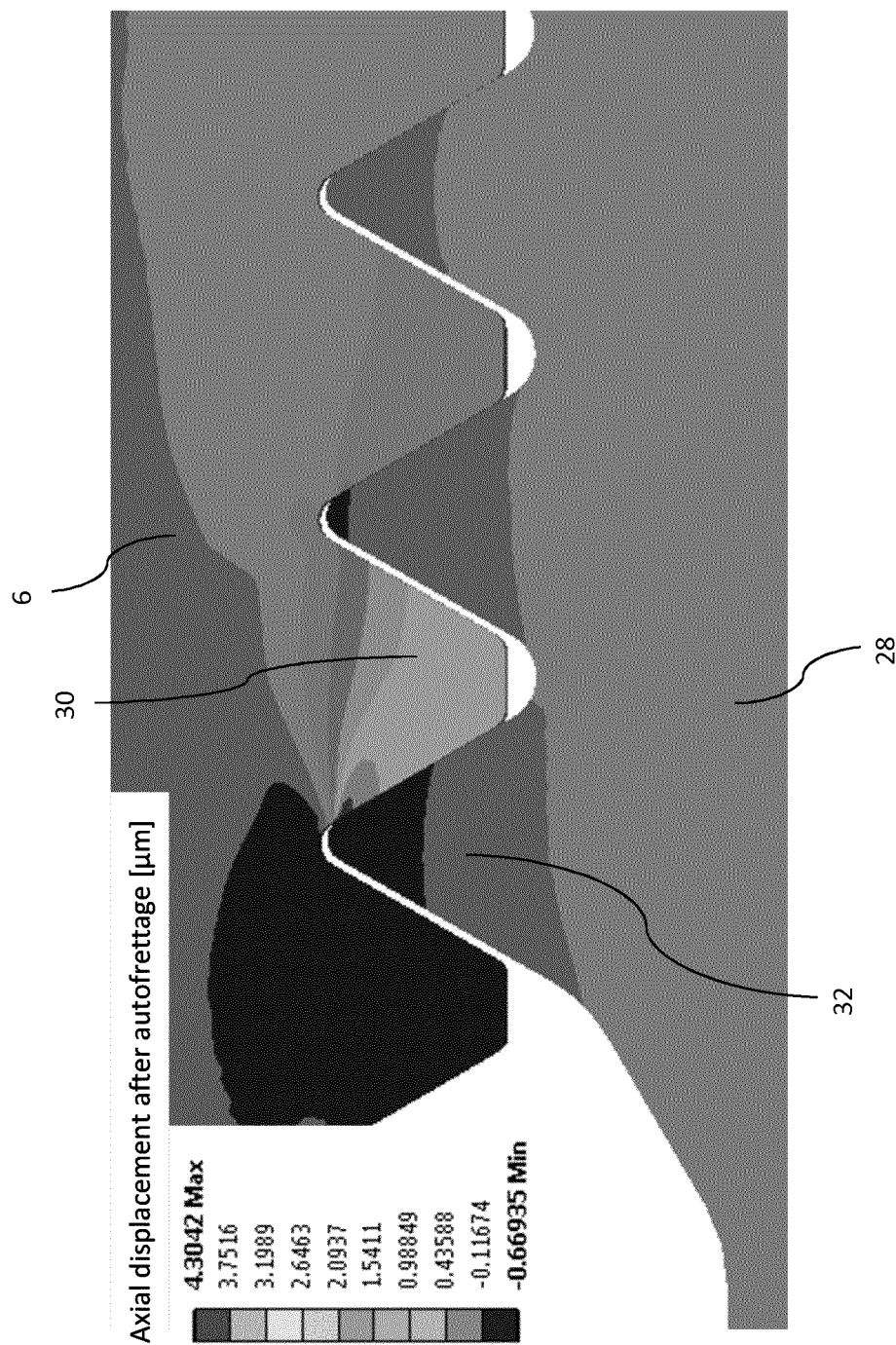
FIG. 12 illustrates the axial displacements that are generated in the most carrying threads of the connecting port and the plug after autofrettage according to the invention.

FIG. 12 illustrates the axial displacements that are generated in the threads of the connecting port and the plug after autofrettage according to the invention. This figure was originally in colors where the lowest or negative displacements (corresponding to the lower portions of the vertical scale) were represented in dark blue. In FIG. 11 (which is in black and white for reprography purposes), these areas are the darkest ones, e.g. at the crest of the first turn of the male thread of the plug 28 and the whole non wearing turn (at the left) of the female thread of the port 6. Still in the original representation in colors, the highest displacements values (corresponding to the upper portions of the vertical scale) were represented in red. In FIG. 12, these areas are essentially on the right flank at the root level of the first wearing thread turn of the port 6. We can therefore observe that the highest displacement values are at the first wearing root portion of the female thread where normally cracks are initiated (see FIG. 5), this displacement resulting thereby in the compressive stresses visible in the table of FIG. 11.

A softer stainless steel plug material and a plug out of aluminium and their impact on the stress distribution in the thread including the change in stress amplitude for the most critical first thread have been simulated.

For instance, a simulation has been performed with a softer stainless steel material AISI 304 L having a lower yield strength than the aluminium. The tensile yield strength of AISI 304 L is indeed 210 MPa whereas the tensile yield strength of AW-6082-T6 is 323 MPa. The simulation results for the second load step (complete load removal) show larger zones of plastic straining at the two first male threads leading to an axial displacement. In the normal stress range distribution of the female threads for the softer stainless steel material, the second thread changed to the most critical thread but also residual compressive stresses are generated in the first female thread roots. However, the maximum normal stress amplitude is highly reduced similarly to the harder screw material.

Also interesting is the use of aluminum for the plug having a much lower modulus of elasticity. Analogously to the softer stainless steel screw, there is a huge zone of plastic straining in the first male thread. Also for this material combination, the second thread is after the static overload the most critical one due to the subsequent cyclic pressure loading. The highest normal stress amplitude of the first carrying thread is reduced by 28%.

Generally speaking, with the autofrettage according to the present invention residual compressive stresses are generated in the first wearing turn of the female threads. In addition to the autofrettage effect, i.e. a shifted mean stress value to lower or negative values without changing the stress amplitude for a cyclic loading, a redistribution of stresses in the threads occurred. Thus, the most critical first female thread showed a reduced stress amplitude and the fatigue resistance was improved so that the complete valve body withstands smoothly a higher number (e.g. one million) cycles for the mentioned cyclic pressure range.

Still generally speaking, if a softer material is chosen the plug should preferably be the final functional group which is installed for the end product. Indeed, if another plug whose first threads are not plastically deformed is used for the autofrettage, it might increase the stress amplitude again in the first female thread. Therefore a plug with a very high yield strength compared to the female thread should be used if the plug is later on changed by the functional assembly group i.e. the aim is to induce plasticity in the one thread which is the most critical one for the subsequent cyclic load. Furthermore, a soft screw material leads to a smaller zone of residual compressive stresses in the critical female thread root.

The invention claimed is:

1. A method of treatment of a metallic body comprising:
    providing the metallic body with an internal volume for a fluid and at least one threaded connecting port to the internal volume;
    treatment by autofrettage of the internal volume, said treatment comprising:
        closing the internal volume by screwing a plug to each of the at least one threaded connecting port;
        applying an autofrettage pressure to a liquid inside said internal volume;
    wherein the autofrettage pressure applies to a cross-sectional surface area of the at least one plug that is greater than one of the following percentages of a cross-sectional surface of the thread of the corresponding threaded connecting port, so that the thread is also subject to the autofrettage treatment, thereby improving the mechanical behavior of the metallic body:
    40%;
    60%; and
    70%; and
    wherein each of the at least one plug is made of a metallic material with a modulus of elasticity that is greater by one of the following percentages of the modulus of elasticity of the material of the metallic body:
    at least 50%;
    at least 100%; and
    at least 150%.

2. The method according to claim 1, wherein each of the at least one plug has a thread according to one of the following:
    at least 5 turns;
    at least 7 turns; and
    at least 9 turns.

3. The method according to claim 1, wherein each thread of the at least one threaded connecting port has turns according to one of the following:
    at least 5 turns;
    at least 7 turns; and
    and at least 9 turns.

4. The method according to claim 1, wherein the pressure of the autofrettage treatment is one of the following:
    between 100 MPa and 500 MPa; and
    between 200 MPa and 400 MPa.

5. The method according to claim 1, wherein the metallic body is made of one of the following:
    aluminum;
    wrought aluminum; and
    aluminum of the 6000 series according to the International Alloy Designation System.

6. The method according to claim 1, wherein each of the at least one plug is made of a metallic material with a tensile yield strength that is greater by one of the following percentages of a tensile yield strength of the material of the metallic body:
    at least 20%;
    at least 50%; and
    at least 80%.

7. The method according to claim 1, wherein each of the at least one plug is made of steel or stainless steel.

8. The method according to claim 1, wherein the metallic body is free of external compression forces of a tooling during the autofrettage treatment.

9. The method according to claim 1, wherein the autofrettage treatment comprises:
    a single pressure application during one of the following lapse of time:
        between 0.1 second and 10 seconds; and
        between 0.5 second and 5 seconds.

10. The method according to claim 1, wherein the pressure of the autofrettage treatment is one of the following percentages of a yield strength of the material of the metallic body:
    between 50% and 200%;
    between 80% and 180%; and
    between 100% and 150%.

11. The method according to claim 1, wherein after the autofrettage treatment, the metallic body is assembled by screwing in each of the at least one threaded connecting port, a final element with a thread corresponding to the thread of the threaded connecting port, each of the at least one plug being configured so that its thread engages the same turns of the thread of the corresponding threaded connecting port as the final element.

12. The method according to claim 1, wherein the metallic body is the body of a gas valve or a connecting pipe with at least an inlet port, an outlet port, and a passage connecting the inlet port with the outlet port.

13. A method of treatment of a metallic body comprising:
    providing the metallic body with an internal volume for a fluid and at least one threaded connecting port to the internal volume; and
    treatment by autofrettage of the internal volume, said treatment comprising:
        closing the internal volume by screwing a plug to each of the at least one threaded connecting port; and
        applying an autofrettage pressure to a liquid inside said internal volume;
    wherein the autofrettage pressure applies to a cross-sectional surface area of the at least one plug that is greater than one of the following percentages of a cross-sectional surface area of the thread of the corresponding threaded connecting port, so that the thread is also subject to the autofrettage treatment, thereby improving the mechanical behavior of the metallic body:
    40%;
    60%; and
    70%; and
    wherein each of the at least one plug is made of a metallic material with a tensile yield strength that is greater by one of the following percentages of a tensile yield strength of the material of the metallic body:

at least 20%;
at least 50%; and
at least 80%.

14. A method of treatment of a metallic body comprising:
providing the metallic body with an internal volume for a fluid and at least one threaded connecting port to the internal volume; and
treatment by autofrettage of the internal volume, said treatment comprising:
closing the internal volume by screwing a plug to each of the at least one threaded connecting port; and
applying an autofrettage pressure to a liquid inside said internal volume;
wherein the autofrettage pressure applies to a cross-sectional surface area of the at least one plug that is greater than one of the following percentages of a cross-sectional surface area of the thread of the corresponding threaded connecting port, so that the thread is also subject to the autofrettage treatment, thereby improving the mechanical behavior of the metallic body:
40%;
60%; and
70%; and
wherein after the autofrettage treatment, the metallic body is assembled by screwing in each of the at least one threaded connecting port, a final element with a thread corresponding to the thread of the threaded connecting port, each of the at least one plug being configured so that its thread engages the same turns of the thread of the corresponding threaded connecting port as the final element.

* * * * *